(12) United States Patent
McElhose et al.

(10) Patent No.: US 10,985,639 B2
(45) Date of Patent: Apr. 20, 2021

(54) AXIAL FLUX ELECTRICAL MOTOR ASSEMBLY AND METHODS OF ASSEMBLING THE SAME

(71) Applicant: Regal Beloit America, Inc., Beloit, WI (US)

(72) Inventors: Leonard Theodore McElhose, Tipp City, OH (US); Paul Steven Mullin, Yellow Springs, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 16/296,974

(22) Filed: Mar. 8, 2019

(65) Prior Publication Data

US 2020/0287451 A1 Sep. 10, 2020

(51) Int. Cl.
*H02K 21/24* (2006.01)
*H02K 1/30* (2006.01)
*H02P 6/182* (2016.01)
*H02K 15/02* (2006.01)
*H02K 1/18* (2006.01)

(52) U.S. Cl.
CPC ............ *H02K 21/24* (2013.01); *H02K 1/182* (2013.01); *H02K 1/30* (2013.01); *H02K 15/02* (2013.01); *H02P 6/182* (2013.01)

(58) Field of Classification Search
CPC .......... H02K 21/24; H02K 1/182; H02K 1/30; H02K 15/02; H02P 6/182
See application file for complete search history.

(56) References Cited

U.S. PATENT DOCUMENTS

| | | | |
|---|---|---|---|
| 5,551,918 A * | 9/1996 | Jones | F16D 3/725 464/147 |
| 6,922,004 B2 | 7/2005 | Hashimoto et al. | |
| 7,342,342 B2 * | 3/2008 | Naitou | H02K 7/116 310/209 |
| 8,536,750 B2 * | 9/2013 | Ai | H02K 7/125 310/191 |
| 9,614,417 B2 | 4/2017 | Lee et al. | |
| 2011/0273050 A1 | 11/2011 | Chien et al. | |
| 2014/0021810 A1 * | 1/2014 | Figgins | H02K 5/24 310/51 |
| 2018/0083495 A1 | 3/2018 | Beckman et al. | |

* cited by examiner

*Primary Examiner* — Minh N Trinh
(74) *Attorney, Agent, or Firm* — Armstrong Teasdale LLP (57) ABSTRACT

A method of assembling an electric motor includes coupling a rotor hub to a rotor disk to form a rotor assembly and slidably coupling the rotor hub to a shaft at a first position. The method also includes coupling a stator assembly to the shaft to define a first axial gap between the stator assembly and the rotor assembly. The method further includes sliding the rotor assembly to a second position along the shaft to define a second axial gap between the stator assembly and the rotor assembly. The second position is based on a measured back EMF constant of the electric motor when the rotor assembly is in the second position.

20 Claims, 6 Drawing Sheets

AXIAL FLUX ELECTRICAL MOTOR ASSEMBLY AND METHODS OF ASSEMBLING THE SAME

BACKGROUND

The embodiments described herein relate generally to axial flux electric motors, and more particularly, to axial flux electric motors having an adjustable rotor assembly.

In electric motor design, back electromotive force (back EMF) is a critical parameter for motor efficiency and also for the motor operational envelope (torque and speed). Back EMF is commonly used to refer to the voltage that occurs in electric motors where there is relative motion between the rotor assembly and the magnetic field produced by the stator assembly, thus also acting as a generator while running as a motor. This voltage is in series with and opposes the original applied voltage. With a lower overall voltage across motor's internal resistance as the motor turns faster, the current flowing into the motor decreases, causing a decrease in motor speed. Because back EMF is proportional to the speed of the motor, as the speed decreases, so does the back EMF. The reduction in back EMF causes an increase in the voltage (and, therefore, current) across the motor. This additional current produces the extra torque that the motor needs in order to regain its speed with the increased load. Motors are designed with a back EMF constant that allows the motor to draw the rated current and deliver the rated torque when running at the rated speed.

However, back EMF is affected by several manufacturing variations, which make it a difficult parameter to control with a high degree of accuracy. For example, one of the primary variations that affect the back EMF of the motor is the size of the axial air gap between the rotor assembly and the stator assembly. At least some known motors are designed with a predetermined air gap that provides a predetermined back EMF constant. However, after assembly of at least some known motors, the actual air gap may be different form the predetermined desired air gap due to manufacturing tolerances. Each component of the motor has its own manufacturing tolerance range and, as those components are stacked up along the shaft, the tolerances compound on each other and can cause the air gap to deviate from the intended design and have an undesired effect on performance of the motor overall.

BRIEF DESCRIPTION

In one aspect, a method of assembling an electric motor is provided. The method includes coupling a rotor hub to a rotor disk to form a rotor assembly and slidably coupling the rotor hub to a shaft at a first position. The method also includes coupling a stator assembly to the shaft to define a first axial gap between the stator assembly and the rotor assembly. The method further includes sliding the rotor assembly to a second position along the shaft to define a second axial gap between the stator assembly and the rotor assembly. The second position is based on a measured back EMF constant of the electric motor when the rotor assembly is in the second position.

In another aspect, a method of assembling an electric motor is provided. The method includes coupling a rotor hub to a rotor disk to form a rotor assembly and slidably coupling the rotor hub to an axially-knurled shaft at a first position. The method also includes coupling a stator assembly to the shaft proximate the rotor assembly and measuring a back EMF constant of the electric motor when the rotor assembly is in the first position. The method further includes sliding the rotor assembly along the shaft to a second position where a measured back EMF constant at the second position is substantially equal to a predetermined back EMF constant.

In yet another aspect, a rotor assembly for use in an axial flux electric motor having a stator assembly is provided. The rotor assembly includes a shaft extending along an axis of rotation and a rotor hub slidably coupled to the shaft such that the shaft extends through a first central opening of the rotor hub. The rotor assembly also includes a rotor disk fixedly coupled to the rotor hub. At least a portion of the rotor hub extends through a second central opening of the rotor disk. The rotor hub and the rotor disk are slidable along the shaft from a first position on the shaft to a second position on the shaft with respect to the stator assembly based on a measured back EMF constant.

DETAILED DESCRIPTION

Described herein are exemplary methods and systems for axial flux electric motors and the assembly thereof. The embodiments described herein include a rotor assembly that is slidable along a shaft after assembly to position the rotor assembly at a location along the shaft that provides the greatest operational efficiency of the motor. More specifically, the rotor assembly includes a rotor hub slidably coupled to an axially-knurled shaft and a rotor disk fixedly coupled to the rotor hub. When the motor has been mostly assembled a first air gap is defined between the rotor assembly and the stator assembly when the rotor assembly is in a first position. The position of the rotor assembly along the shaft is then adjusted based on a measured back EMF constant of the motor. This adjustment changes the size of the air gap defined between the rotor assembly and the stator assembly such that the motor operates at its most efficient.

Accordingly, the motor and method of assembly described herein accommodates for the stack up of manufacturing tolerances of the motor components during assembly by allowing for an adjustable rotor assembly to fine tune the motor efficiency after assembly. Specifically, by basing the position of the rotor assembly, and therefore the size of the final air gap, on a measured back EMF constant and not solely on the physical size of the air gap, the method described herein enables each motor to be independently balanced and fine-tuned for maximum efficiency.

Figure 1:
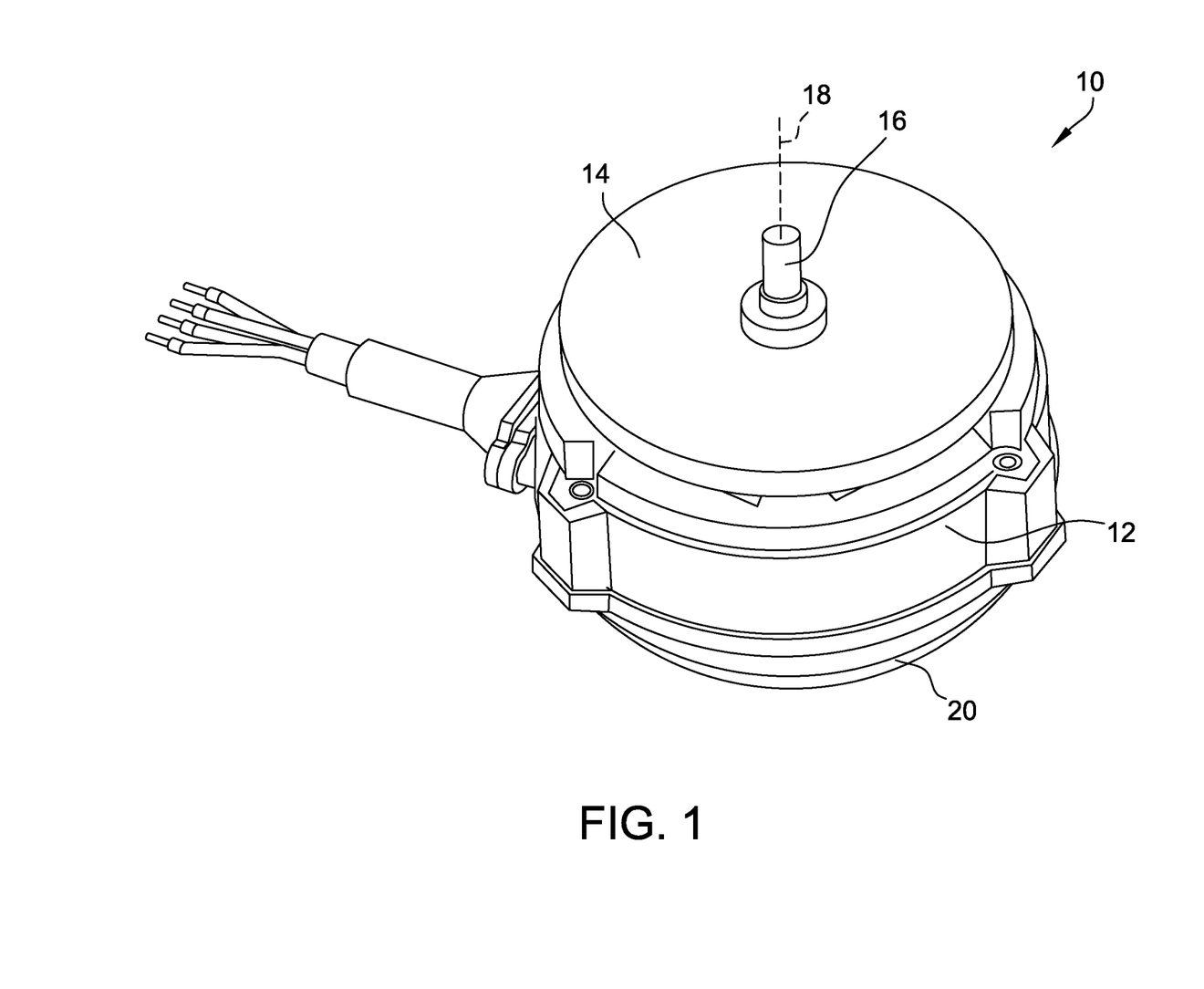
FIG. 1 is a perspective view of an exemplary embodiment of an electric motor.

FIG. 1 is a perspective view of an exemplary embodiment of an electric motor 10. In the exemplary embodiment, motor 10 is an axial flux electric motor including a stator assembly 12, a rotor assembly 14 and a shaft 16. Rotor assembly 14 is coupled to shaft 16 such that shaft 16 and rotor assembly 14 rotate about axis 18. Shaft 16 extends through stationary stator assembly 12 and a cover plate 20 is coupled to stator assembly 12 opposite rotor assembly 14. In the exemplary embodiment, stator assembly 12 includes a plurality of stator teeth (not shown) and windings (not shown) that are over-molded by a resin. Alternatively, stator assembly 12 may not by over-molded by resin.

Figure 2:
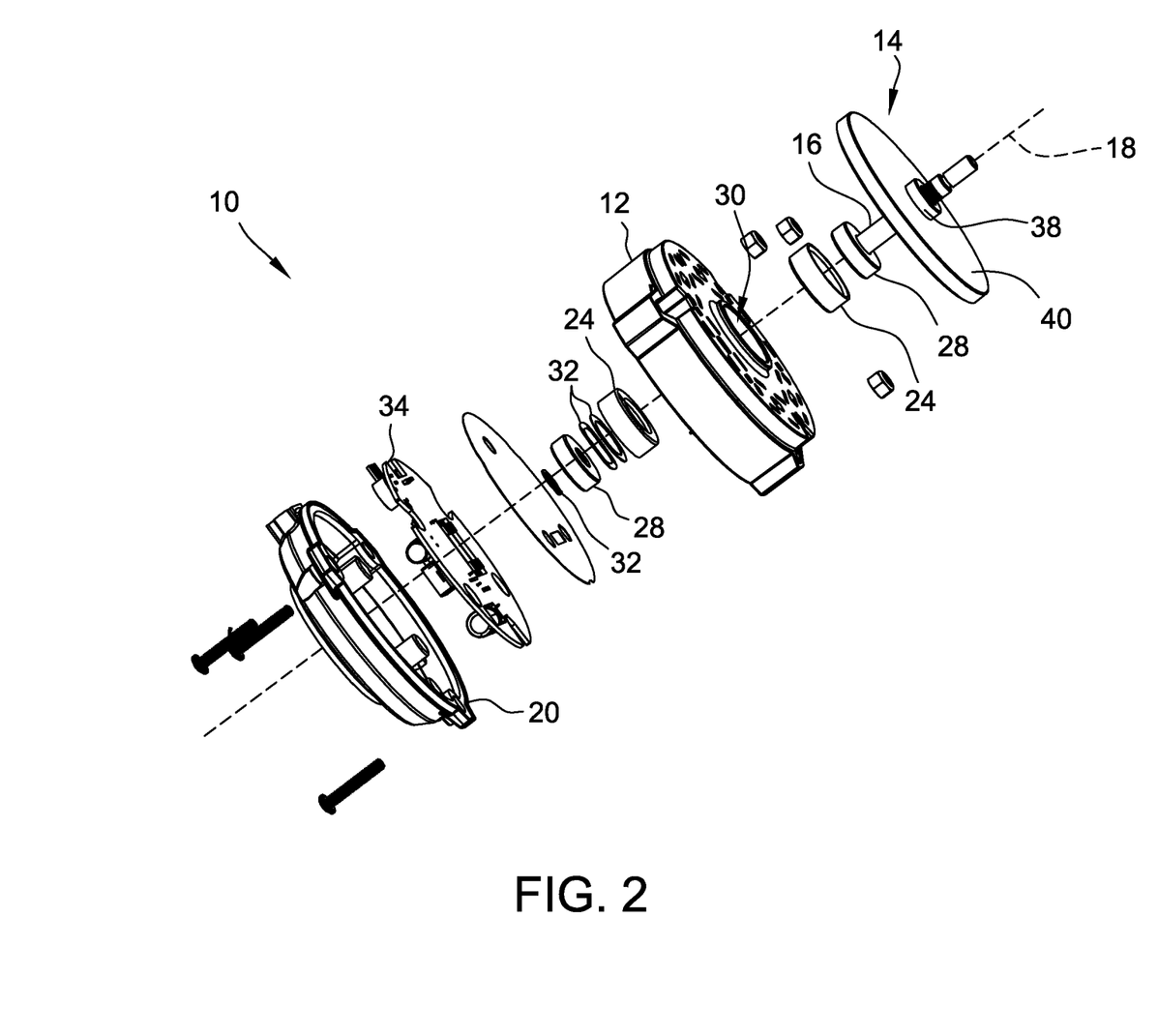
FIG. 2 is an exploded view of the electric motor of FIG. 1.
Figure 3:
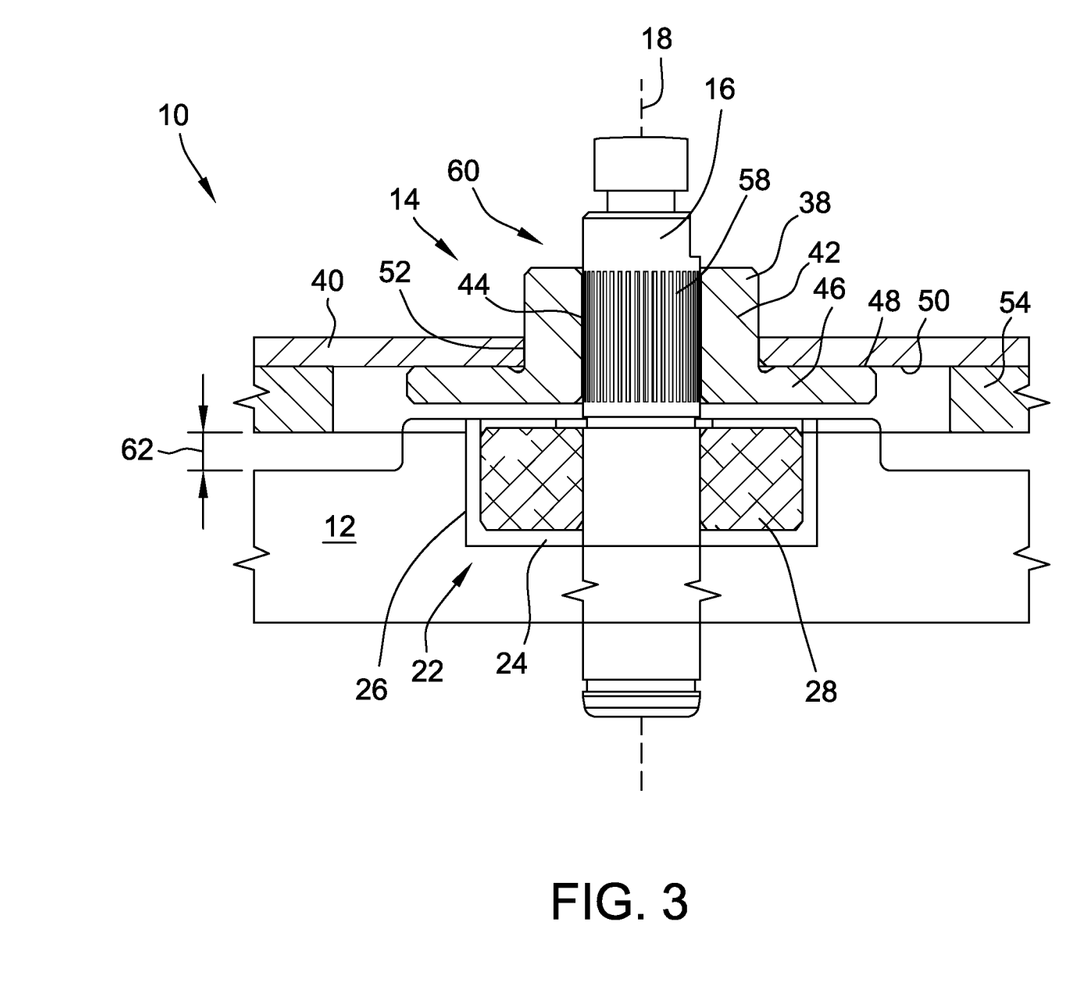
FIG. 3 is an enlarged cross-sectional view of the electric motor of FIG. 1 partially assembled and illustrating a first axial gap.
Figure 4:
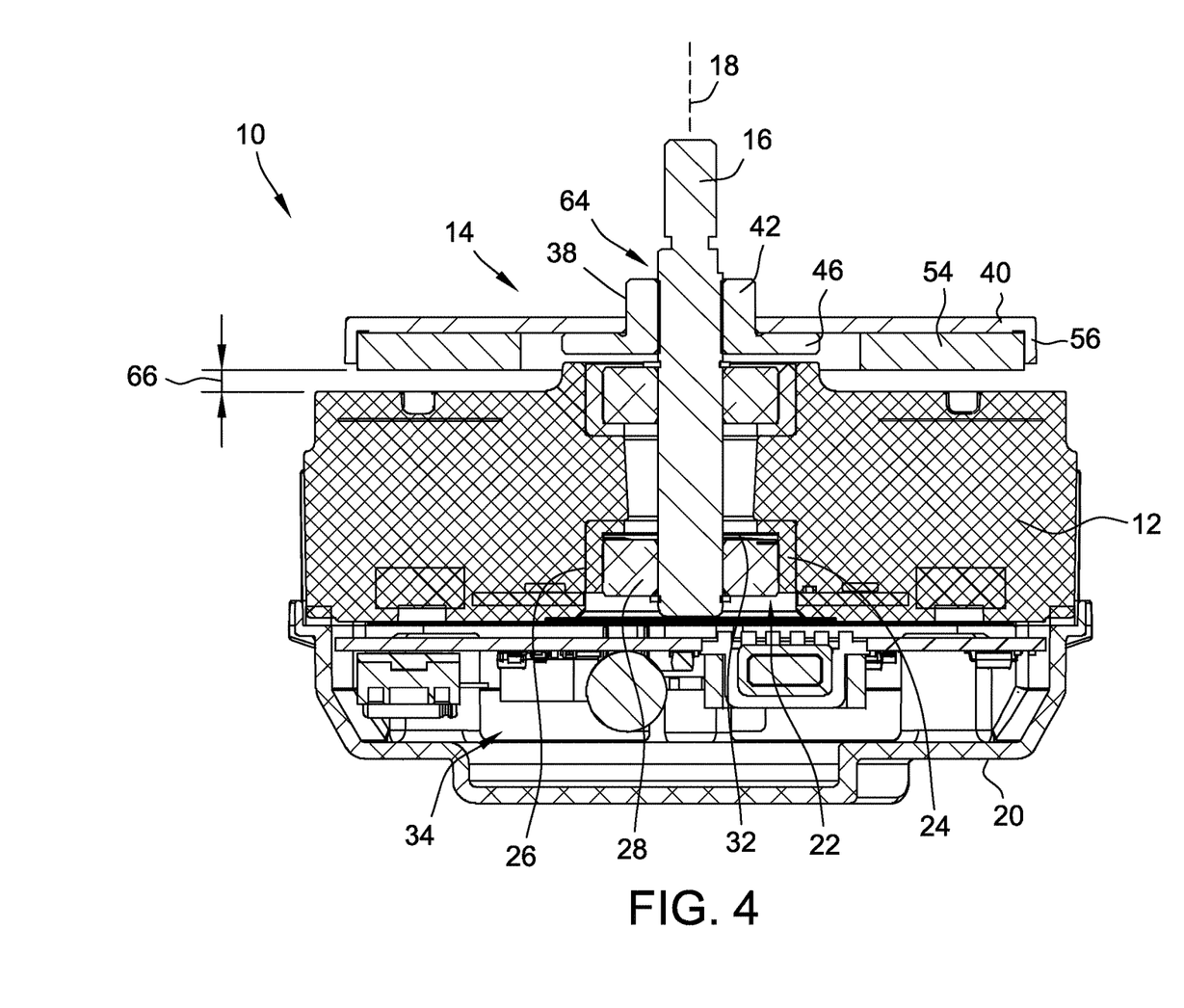
FIG. 4 is a cross-sectional view of the electric motor of FIG. 1 fully assembled and illustrating a second axial gap.

FIG. 2 is an exploded view of electric motor 10. FIG. 3 is an enlarged cross-sectional view of partially assembled electric motor 10. FIG. 4 is a cross-sectional view of fully assembled electric motor 10. In the exemplary embodiment, motor 10 also includes a pair of bearing assemblies 22 that each include a bearing cup 24 positioned within a recess 26 of stator assembly 12. A bearing 28 is then positioned within each bearing cup 24 to enable shaft 16 to rotate within a central bore 30 of stator assembly 12. A plurality of washers and/or retainer rings 32 are positioned proximate bearing assemblies 22 to facilitate operation of motor 10. Motor 10 further includes an electronic panel 34 coupled to stator assembly 12 and positioned within cover plate 20. A plurality of fasteners 36 couple cover plate 20 to stator assembly 12.

In the exemplary embodiment, rotor assembly 14 includes a rotor hub 38 coupled to shaft 16 and a rotor disk 40 coupled to rotor hub 38. As best shown in FIGS. 3 and 4, rotor hub 38 includes a shaft portion 42 having a smooth-bore central opening 44 defined therethrough that receive shafts 16 such that rotor hub 38 is slidably coupled to shaft 16. Rotor hub 38 further includes a flange 46 extending radially outward from an axial end of shaft portion 42.

In the exemplary embodiment, rotor disk 40 is fixedly coupled to rotor hub 38. Specifically, flange 46 includes an outer surface 48 that is coupled to an inner surface 50 of rotor disk 40 using an adhesive. Alternatively, outer surface 48 is coupled to inner surface 50 using any means that facilities operation of rotor assembly 14 as described herein. Further, rotor disk 40 includes a central opening 52 that receives shaft portion 42 therethrough. As such, rotor hub 38 spaces rotor disk 40 from shaft 16 such that rotor disk 16 does not contact shaft 16.

Rotor assembly 14 also includes at least one magnet 54 coupled to inner surface 50 of rotor disk 40 and retained by an outer rim 56 of rotor disk 40. In one embodiment, magnet 54 is coupled to inner surface 50 using an adhesive. Alternatively, magnet 54 is coupled to inner surface 50 by any means that facilitates operation of rotor assembly 14 as described herein. As shown in FIGS. 3 and 4, magnet 54 circumscribes a portion of rotor hub 38. More specifically, magnet 54 circumscribes flange 46 of rotor hub 38.

In the exemplary embodiment, shaft 16 includes axially-oriented knurling 58 on the exterior surface thereof that enables slidable adjustment of rotor assembly 14, and more specifically, rotor hub 38, along shaft 16. The inner surface of rotor hub 38 that defines central opening 44 engages knurling 58 when rotor hub 38 is press-fit onto shaft 16. Knurling 58 acts as a friction-reducing guide to allow for axial movement of rotor hub 38, and rotor assembly 14 overall, with respect to shaft 16. Furthermore, because of its axial orientation, knurling 58 also reduces or prevents rotational movement of rotor hub 38 with respect to shaft 16, thus maintaining the torque of motor 10.

FIG. 3 illustrates rotor assembly 14 in a first position 60 along shaft 16 that defines a first axial gap 62 between stator assembly 12 and rotor assembly 14. More specifically, rotor hub 38 is press-fit onto shaft 16 and slid along knurling 58 to the first position 60 to define first axial gap 62 between magnet 54 and stator assembly. Similarly, FIG. 4 illustrates rotor assembly 14 in a second position 64 along shaft 16 that defines a second axial gap 66 between stator assembly 12 and rotor assembly 14. More specifically, after initially being coupled to shaft 16 and positioned in the first position 60, rotor hub 38 is slid further along knurling 58 of shaft 16 to the second position 60 to define second axial gap 66 between magnet 54 and stator assembly 12. As described herein, second axial gap 66 is smaller than first axial gap 62. More specifically, first axial gap is within a range of between approximately 3.0 millimeters (mm) and 5.0 mm, and second axial gap is within a range of between approximately 2.4 mm and 2.8 mm. Alternatively, gap 62 and 66 are any size that facilitates operation of motor 10 as described herein.

Figure 5:
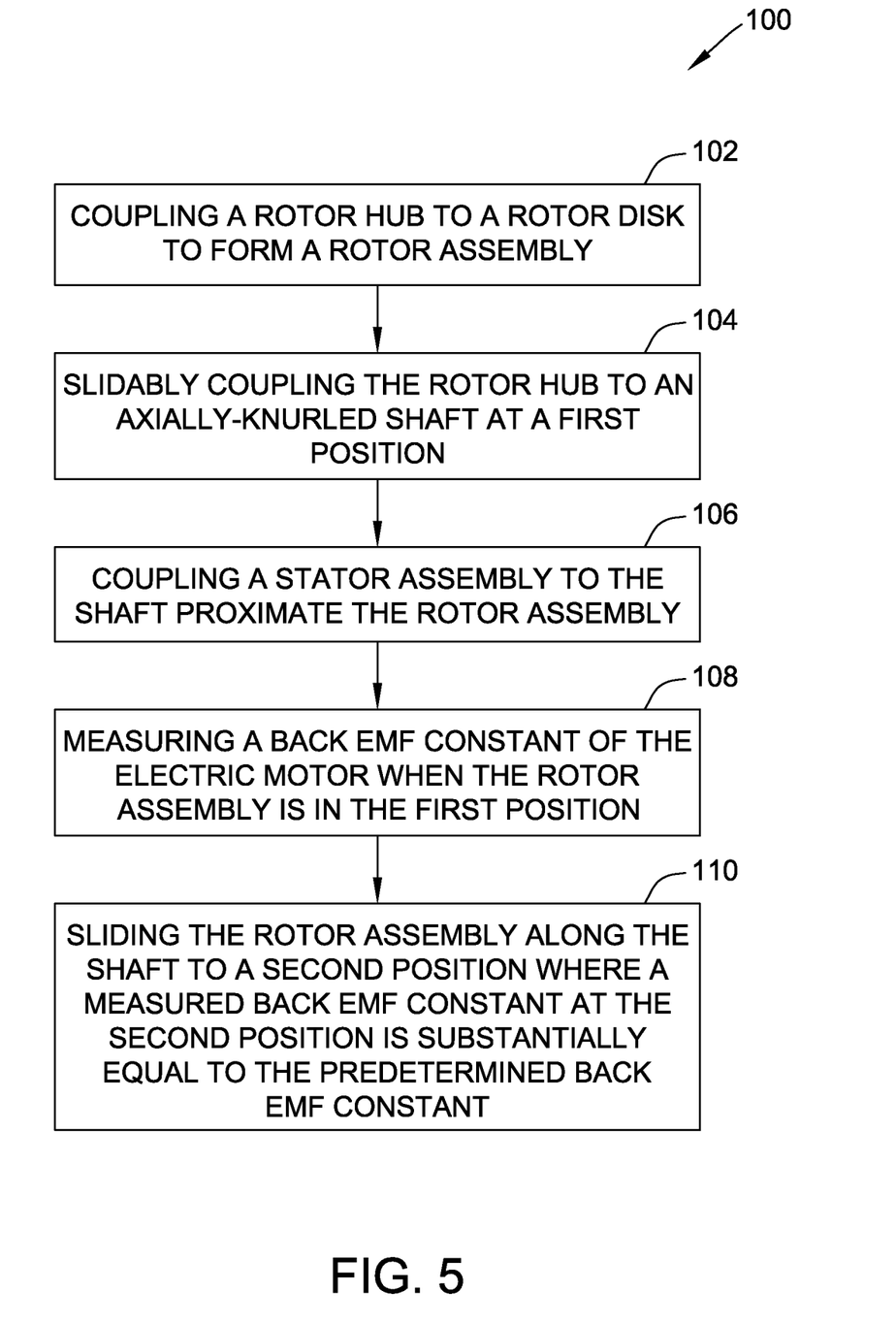
FIG. 5 is a flow chart illustrating an exemplary method of assembling the electric motor of FIG. 1.

FIG. 5 is a flow chart illustrating an exemplary method 100 of assembling motor 10. In the exemplary embodiment, method 100 includes coupling 102 rotor hub 38 to rotor disk 40 to at least partially form rotor assembly 14. As described herein, the method 100 also includes coupling magnet 54 to rotor disk. Rotor assembly 14 is then coupled to shaft 16 by slidably coupling 104 rotor hub 38 along knurling 58 to first position 60 on shaft 16.

Method 100 further includes coupling 106 stator assembly 12 to shaft 16 proximate rotor assembly 14 and measuring 108 a back EMF constant of motor 10 while rotor assembly 14 is in the first position 60. Method 100 further includes comparing the measured back EMF constant at the first position 60 to the predetermined desired back EMF constant, wherein the measured back EMF constant at the first position 60 is different from the predetermined desired back EMF constant. After the back EMF constant is measured while rotor assembly 14 is in the first position 60, rotor assembly 14 is slid 110 along shaft 16 to the second position 64 such that the measured back EMF constant at the second position 64 is substantially similar to a predetermined desired back EMF constant.

As described herein, coupling 106 stator assembly 12 includes coupling stator assembly 12 to define first axial gap 62 between stator assembly 12 and rotor assembly 14 in the first position 60. Furthermore, sliding 110 rotor assembly 14 includes sliding rotor assembly 14 to define second axial gap 66 between stator assembly 12 and rotor assembly 14. As such, in the exemplary embodiment, the back EMF constant of motor 10 is measured and the position of rotor assembly 14 is adjusted along shaft 16, after assembly, so that the measured back EMF constant matches the predetermined desired back EMF constant that motor 10 was designed to have. Accordingly, when rotor assembly 14 is adjusted to the second position 64 to account for the back EMF measurement, the first axial gap 62 shortens to the second axial gap 66. As such, the second position 64 of rotor assembly 14 and the second axial gap 66 are not based on the physical size of the second air gap 66, but are based on the measured back EMF constant of motor 10.

Figure 6:
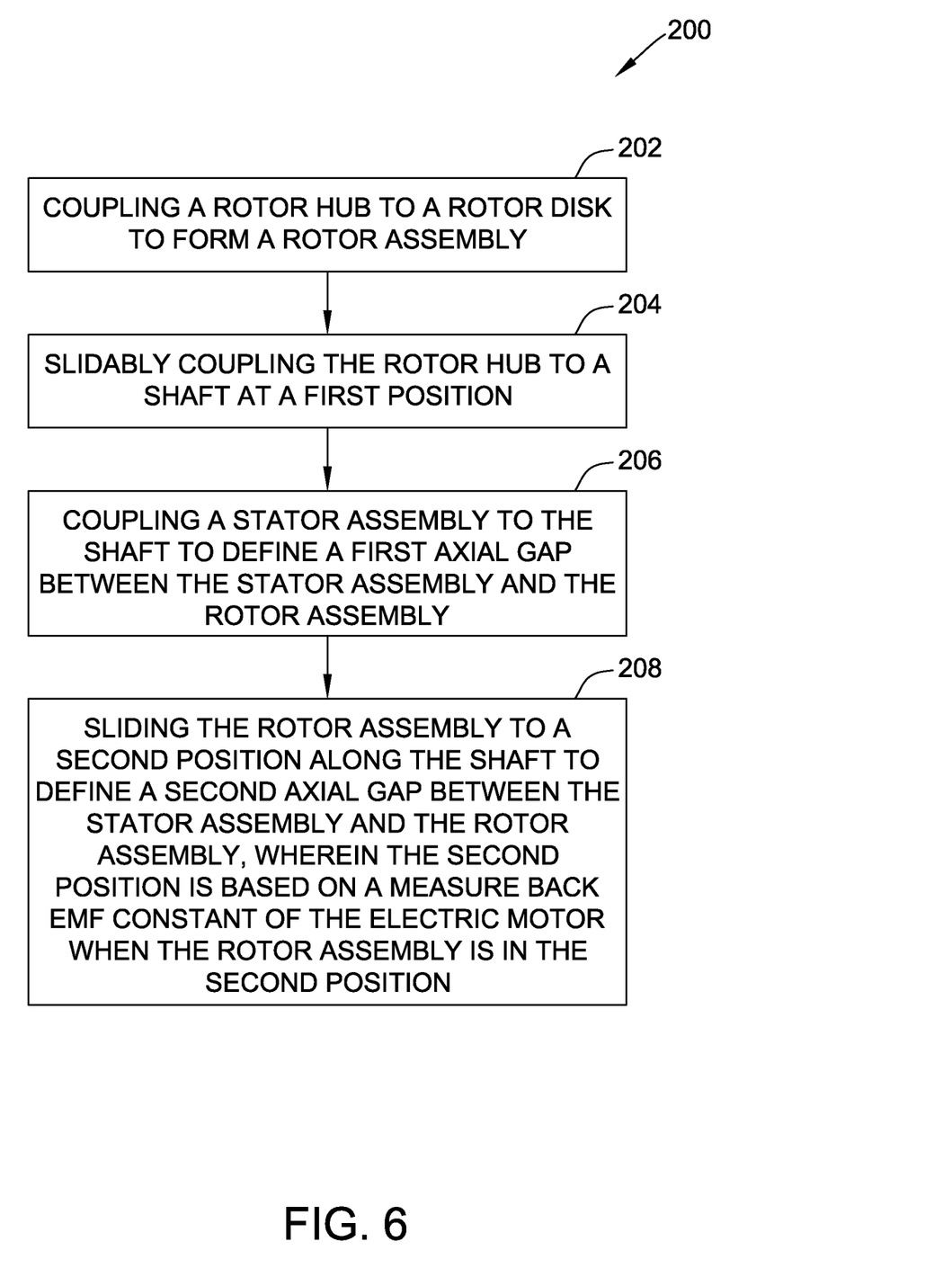
FIG. 6 is a flow chart illustrating another method of assembling the electric motor of FIG. 1.

FIG. 6 is a flow chart illustrating an exemplary method 200 of assembling motor 10. In the exemplary embodiment, method 200 includes coupling 202 rotor hub 38 to rotor disk 40 to at least partially form rotor assembly 14. As described herein, the method 200 also includes coupling magnet 54 to rotor disk. Rotor assembly 14 is then coupled to shaft 16 by slidably coupling 204 rotor hub 38 along knurling 58 to first position 60 on shaft 16.

Method 200 further includes coupling 206 stator assembly 12 to shaft 16 to define first axial gap 62 between stator assembly 12 and rotor assembly 14. Coupling steps 204 and 206 may be performed in either order to initially define first axial gap 62. As described herein, rotor assembly 14 is slid along shaft 16 to define first axial gap 62 between magnet 54 and stator assembly 12 in the first position 60. In the exemplary embodiment first axial gap 62 is within a range of between approximately 3.0 millimeters (mm) and 5.0 mm. Once the first axial gap 62 is formed, at least one bearing assembly 22 is coupled to shaft 16 along with washers and retaining ring 32.

When motor 10 has been fully assembled, with the exception of electronics panel 34 and cover 20, rotor assembly 14 and stator assembly 12 are subjected to dynamic balancing to prevent excessive loading of bearing assemblies 22 and to prevent undesired vibrations and noise generation. As is known, dynamic balancing is generally performed by taking vibration measurements during operation and adding compensating masses or removing material at prescribed locations until the vibration is reduced or removed. In the exemplary embodiment, the dynamic balancing is performed when rotor assembly 14 is in the first position 60.

Method 200 also includes sliding 208 the rotor assembly 14 to the second position 64 along shaft 16 to define second axial gap 66 between stator assembly 12 and rotor subassembly 14 such that the second position 64 is based on a measured back EMF constant of motor 10 when rotor assembly 14 is in the second position 64. As described herein, second axial gap 66 is smaller than first axial gap 62. In the exemplary embodiment second axial gap 66 is within a range of between approximately 2.4 mm and 2.8 mm. More specifically, method 200 also includes coupling magnet 54 to rotor disk 40 such that first axial gap 62 and second axial gap 66 are defined between magnet 54 and an axial end surface of stator assembly 12.

In the exemplary embodiment, the sliding step 208 of method 200 includes measuring the back EMF constant of motor 10 when rotor assembly 14 is in the first position 60 and comparing the measured back EMF constant at the first position 60 to a predetermined desired back EMF constant. Upon a determination that the back EMF constant measurement at the first position 60 defining the first axial gap 62 is different from the predetermined desired back EMF constant, then the rotor assembly 14 is slid along shaft 16 and a back EMF constant measurement is taken continuously as rotor assembly 14 is moved along shaft until the measured back EMF constant is substantially equal to the predetermined desired back EMF constant.

The location where the measured back EMF constant is substantially equal to the predetermined desired back EMF constant is the second position 64 and defines second axial gap 66. As such, the second axial gap 66, physically defined between stator assembly 12 and magnet 54, is determined by measuring the back EMF constant of motor 10 along shaft and adjusting the location of the rotor assembly 14 until the measured back EMF constant is substantially equal to the predetermined desired back EMF constant that was designed for motor 10.

In the exemplary embodiment, the back EMF constant of motor 10 is measured and the position of rotor assembly 14 is adjusted along shaft 16, after assembly, so that the measured back EMF constant matches the predetermined desired back EMF constant that motor 10 was designed to have. Accordingly, when rotor assembly 14 is adjusted to the second position 64 to account for the back EMF measurement, the first axial gap 62 shortens to the second axial gap 66. As such, the second position 64 of rotor assembly 14 and the second axial gap 66 are not based on the physical size of the second air gap 66, but are based on the measured back EMF constant of motor 10.

The present disclosure provides for axial flux motors that are finely tuned for improved efficiency and reduced noise production. Specifically, the embodiments described herein include a rotor assembly that is slidable along a shaft after assembly to position the rotor assembly at a location along the shaft that provides the greatest operation efficiency of the motor. More specifically, the rotor assembly includes a rotor hub slidably coupled to an axially-knurled shaft and a rotor disk fixedly coupled to the rotor hub. When the motor has been mostly assembled a first air gap is defined between the rotor assembly and the stator assembly when the rotor assembly is in the first position. The position of the rotor assembly along the shaft is then adjusted based on a measured back EMF constant of the motor. This adjustment changes the size of the air gap defined between the rotor assembly and the stator assembly such that the motor operates at its most efficient.

Accordingly, the motor and method of assembly described herein accommodates for the stack up of manufacturing tolerances of the motor components during assembly by allowing for an adjustable rotor assembly to fine tune the motor efficiency after assembly. Specifically, by basing the position of the rotor assembly, and therefore the size of the final air gap, on a measured back EMF constant and not solely on the physical size of the air gap, the method described herein enables each motor to be independently balanced and fine-tuned for maximum efficiency.

The embodiments described herein relate to an axial flux electric motor and methods of assembling the same. Specifically, the embodiments relate to electric motors that include a rotor assembly that is slidable along a shaft after assembly to position the rotor assembly at a location along the shaft that provides the greatest operation efficiency of the motor. More specifically, the rotor assembly includes a rotor hub slidably coupled to a shaft and a rotor disk fixedly coupled to the rotor hub. When the motor has been mostly assembled, it is dynamically balanced and then the position of the rotor assembly along the shaft is adjusted based on a measured back EMF constant of the motor. This adjustment changes the size of the air gap defined between the rotor assembly and the stator assembly such that the motor operates at its most efficient. The methods and apparatus are not limited to the specific embodiments described herein, but rather, components of apparatus and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an electric motor that includes a rotor hub and a rotor disk that make up a rotor assembly, a stator assembly, and a shaft, said method comprising:

determining a desired back electromotive force (EMF) constant of the electric motor;

coupling the rotor hub to the rotor disk to form the rotor assembly;

slidably coupling the rotor hub to the shaft at a first position;

coupling the stator assembly to the shaft to define a first axial gap between the stator assembly and the rotor assembly;

measuring a back EMF constant of the electric motor when the rotor assembly is in the first position;

comparing the measured back EMF constant at the first position to the determined desired back EMF constant;

sliding the rotor assembly to a second position along the shaft to define a second axial gap between the stator assembly and the rotor assembly; and measuring the back EMF constant of the electric motor when the rotor assembly is in the second position, wherein the second position is based on a the measured back EMF constant of the electric motor when the rotor assembly is in the second position, wherein the electric motor is formed with the rotor assembly in the second position.

2. The method according to claim 1, wherein sliding the rotor assembly comprises sliding the rotor assembly such that the second axial gap is smaller than the first axial gap.

3. The method according to claim 1, further comprising coupling at least one bearing assembly to the shaft before sliding the rotor assembly to the second position.

4. The method according to claim 1, further comprising coupling at least one magnet to the rotor disk, wherein the first axial gap and second axial gap are defined between the at least one magnet and the stator assembly.

5. The method according to claim 1, wherein sliding the rotor assembly comprises sliding the rotor assembly such that the first axial gap is within a range of between approximately 3.0 millimeters (mm) and 5.0 mm.

6. The method according to claim 1, wherein sliding the rotor assembly comprises sliding the rotor assembly such that the second axial gap is within a range of between approximately 2.4 mm and 2.8 mm.

7. The method according to claim 1, further comprising dynamically balancing the rotor assembly while in the first position.

8. The method according to claim 1, wherein sliding the rotor assembly to the second position comprises sliding the rotor assembly from the first position along the shaft until a measured back EMF constant is equal to a predetermined back EMF constant.

9. The method according to claim 1, wherein the measured back EMF constant at the first position is different from the determined desired back EMF constant.

10. The method according to claim 1, wherein the measured back EMF constant at the second position is substantially equal to the determined desired back EMF constant.

11. A method of assembling an electric motor that includes a rotor hub and a rotor disk that make up a rotor assembly, a stator assembly, and a shaft, said method comprising:

determining a desired back electromotive force (EMF) constant of the electric motor;

coupling the rotor hub to the rotor disk to form the rotor assembly;

slidably coupling the rotor hub to the axially-knurled shaft at a first position;

coupling the stator assembly to the shaft proximate the rotor assembly;

measuring the back EMF constant of the electric motor when the rotor assembly is in the first position;

comparing the measured back EMF constant at the first position to the determined desired back EMF constant;

sliding the rotor assembly along the shaft to a second position; and measuring the back EMF constant of the electric motor when the rotor assembly is in the second position, where a measured back EMF constant at the second position is substantially equal to a predetermined back EMF constant, wherein the electric motor is formed with the rotor assembly in the second position.

12. The method according to claim 11, wherein coupling the stator assembly comprises coupling the stator assembly to define a first axial gap between the stator assembly and the rotor assembly in the first position, and wherein sliding the rotor assembly comprises sliding the rotor assembly to define a second axial gap between the stator assembly and the rotor assembly.

13. The method according to claim 11, wherein the measured back EMF constant at the first position is different from the predetermined desired back EMF constant.

14. The method according to claim 11, wherein the measured back EMF constant at the second position is substantially equal to the determined desired back EMF constant.

15. The method according to claim 11, wherein sliding the rotor assembly comprises sliding the rotor assembly such that the second axial gap is smaller than the first axial gap.

16. The method according to claim 11, further comprising coupling at least one bearing assembly to the shaft before sliding the rotor assembly to the second position.

17. The method according to claim 11, further comprising coupling at least one magnet to the rotor disk, wherein the first axial gap and second axial gap are defined between the at least one magnet and the stator assembly.

18. The method according to claim 11, wherein sliding the rotor assembly comprises sliding the rotor assembly such that the first axial gap is within a range of between approximately 3.0 millimeters (mm) and 5.0 mm.

19. The method according to claim 11, wherein sliding the rotor assembly comprises sliding the rotor assembly such that the second axial gap is within a range of between approximately 2.4 mm and 2.8 mm.

20. The method according to claim 11, further comprising dynamically balancing the rotor assembly while in the first position.

* * * * *